Jan. 2 1968   P. G. WATSON   3,361,963
PRECISION INDEXING POSITIONER
Filed Aug. 10, 1964   2 Sheets-Sheet 1

INVENTOR.
PETER G. WATSON
BY
ATTORNEY.

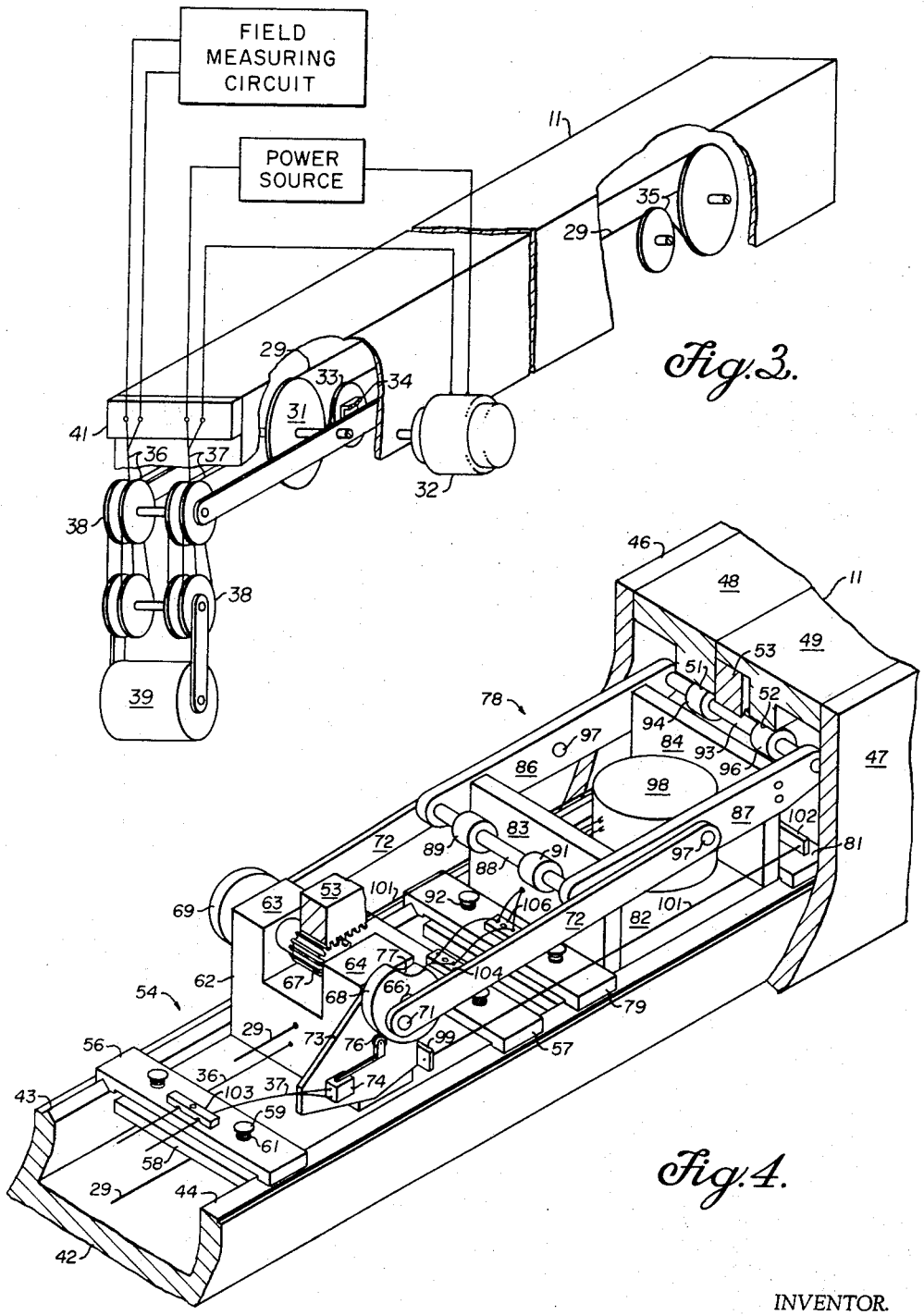

United States Patent Office 3,361,963
Patented Jan. 2, 1968

3,361,963
PRECISION INDEXING POSITIONER
Peter G. Watson, Kensington, Calif., assignor to the United States of America as represented by the United States Atomic Energy Commission
Filed Aug. 10, 1964, Ser. No. 388,734
9 Claims. (Cl. 324—43)

ABSTRACT OF THE DISCLOSURE

This invention is a carriage means for positioning a field strength sensing coil at accurately spaced locations within a magnetic field. A first sled is drawn along a fixed track at constant speed and intermittently stopped by a cam-operated microswitch. A second sled carrying the sensing coil is coupled to the drive sled by involutely-turning crank arms, thereby imparting a non-uniform motion thereto. The device provides highly accurate positioning of the coil at each measuring stop, independent of any inaccuracies in positioning of the carriage.

---

This invention relates to mechanical positioning equipment and more particularly to a rapid and precise mechanism suitable for such purposes as that of positioning a sensing coil at accurately spaced locations within a magnetic field to determine the field strength at a plurality of points. This invention was developed in the course of, or under, contract W-7405-eng-48 with the United States Atomic Energy Commission.

The accurate mapping of magnetic fields with relation to fixed reference points requires the taking of many readings at close intervals which may be of the order of an inch apart for example. The measurements are usually made by moving a sensing coil through the field and integrating the voltage induced therein by any change in the magnetic field. Accurate measurements require that the coil position and the integrated voltage both be precisely known at each reading. The coil is generally moved along a series of uniformly spaced parallel straight lines located in a plane cutting across the magnetic field in the region of interest to produce a map of the magnetic field strength. By using largely manual means for moving and stopping the measuring coil and reading the integrated voltages as has been done in the past, a very accurate pilot of the field strength may be obtained. However this process is very time consuming in view of the large number of readings required. Therefore in order to obtain more speed without sacrificing accuracy a more mechanized system for moving the coil is desired. This invention comprises a unique, precise, rapid and economical structure for accomplishing this purpose.

In a preferred form the invention comprises a first carriage riding on a track and which carries a spur gear with a crank arm connected to the rim thereof. The gear meshes with a precision rack and turns as the carriage moves whereby the end of the crank describes a cycloid curve. The sensing coil is drawn along the track by the crank arm. A cam and microswitch temporarily stops the carriage to complete a field reading when the crank is near the node or peak of the cycloid curve. Owing to the cycloid derived non-uniform motion of the sensing coil, the coil is extremely accurately positioned at each stop irrespective of small inaccuracies in the stopping of the carriage.

Therefore it is an object of the present invention to provide means for rapidly positioning apparatus in a series of locations in a line.

Another object of this invention is the provision of means for accurately and reproducibly positioning apparatus in a series of equally spaced locations in a line.

A further object of the present invention is the provision of improved means for rapidly moving a measuring coil for plotting a magnetic field.

Yet another object of this invention is the provision of improved means for accurately positioning a magnetic field strength measuring coil in successive evenly spaced positions.

Still another object of the present invention is to provide a more economical means for rapidly moving a measuring coil for plotting a magnetic field.

Another object of this invention is the provision of means for positioning a device wherein the device is very precisely stopped at a series of points without requiring such precise stopping of the mechanism which moves the device.

Other objects and advantages of this invention will become obvious to those skilled in the art upon consideration of the following description and accompanying drawing, of which:

Figure 2:
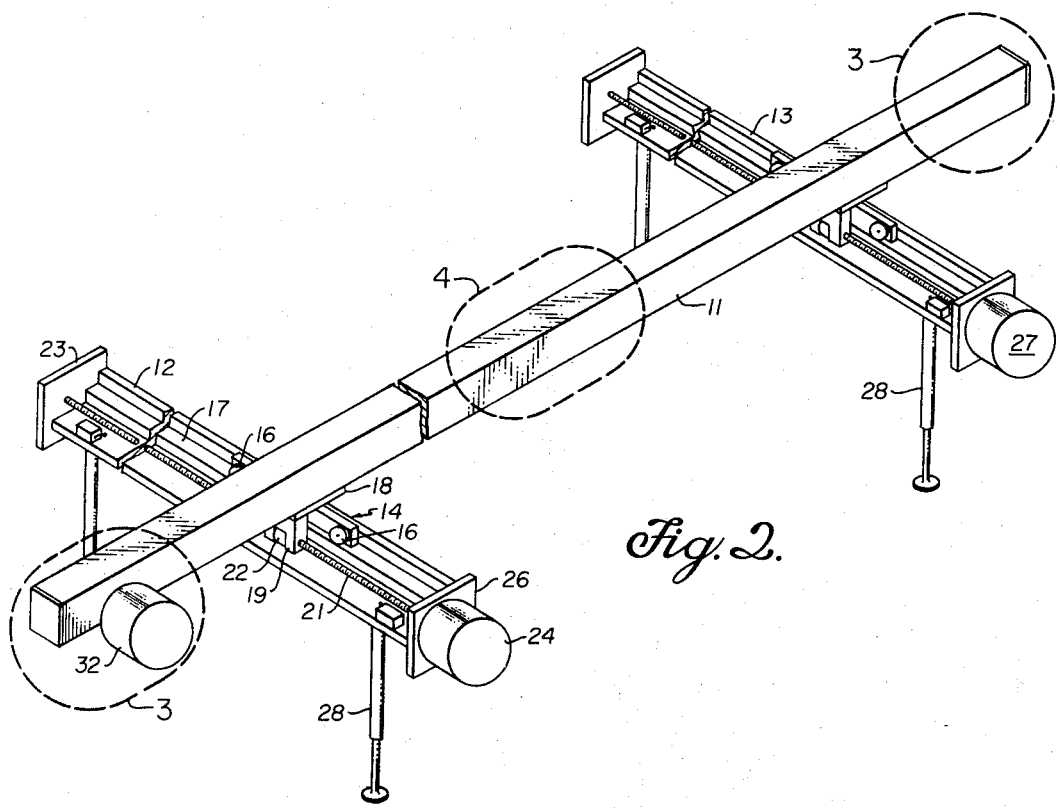
FIGURE 2 is a perspective view of the apparatus of FIGURE 1 with the magnet poles removed and on an enlarged scale to show details of the mechanism.

FIGURE 3 is a cut-away and exploded view of the portion of the mechanism within the area enclosed by dashed line 3 of FIGURE 2 showing means for applying longitudinal drive to the measuring apparatus; and FIGURE 4 is an enlarged cut-away perspective view of the portion of the mechanism of FIGURE 2 within the area enclosed by dashed line 4 thereon showing the measuring coil of the apparatus and means for producing stopped longitudinal motion thereof.

Figure 1:
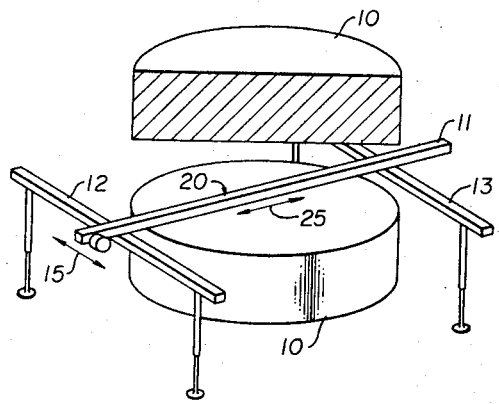
FIGURE 1 is a perspective view of the magnetic field measuring apparatus shown disposed in the field of a pair of electromagnet poles, which is to be mapped.

Referring now to the drawing and particularly to FIGURE 1, a coil guide tube 11 extends through the magnetic field which is to be measured, in this instance the field between spaced apart pole pieces 10. Tube 11 is movably mounted on two supports 12 and 13 which are identical in construction and which are positioned at right angles to the longitudinal axis of the tube. As will be described in more detail, the structure provides for step movement of guide tube 11 across the field of poles 10 at right angles to the tube as indicated by arrow 15. A field sensing coil within the tube, which may momentarily be at point 20 for example, undergoes a stepped longitudinal motion within the tube 11 as indicated by arrow 25 so that a series of measurements of field intensity may be taken at uniformly spaced points throughout the median plane of the field.

Considering now the structure for effecting stepped lateral movement of tube 11 in more detail, and with reference to FIGURE 2, a carriage 14 has two supporting end wheels 16 which ride in a track 17 extending along the support 12 similar elements being provided on support 13. Carriage 14 has a transverse member 18 which supports one end of tube 11. A downwardly projecting arm 19 of the carriage 14 engages a screw 21 by means of antibacklash nut 22. Screw 21 is mounted on the support 12 parallel to track 17, one end being journaled in end plate 23 of the support and the other end attached to the shaft of motor 24 which is mounted on end plate 26 of the support. The motor 24 and the identical motor 27 mounted on support 13 are both stepping motors with quick stop and start action and are of the manually controlled type in this instance. These motors 24 and 27, operating in synchronism, will move the guide tube 11 back and forth in one axis of movement with the tube 11 always substantially parallel to the initial position thereof. The supports 12 and 13 are mounted on adjustable stands 28 for convenience in adjusting tube 11 to the required height.

Referring now to FIGURE 3, an end of the tube 11 is provided with mechanism for producing the longitudinal motion of elements therein. A drive cable 29 passes over a drive pulley 31 which is journaled in brackets supported on tube 11. The drive pulley 31 is directly coupled to the shaft of a motor 32 which is also supported on the tube 11. An idler pulley 33, journaled on brackets 34, provides means for the placement of the return portion of cable 29 within tube 11. Similar but smaller pulleys 35 at the remote end of tube 11 provide means for completing the cable loop. Since it is necessary to have electrical connections to movable apparatus within the tube 11, electrical cables 36 and 37 pass over pulleys 38 which form a double block and tackle arrangement to take up the slack in the cables by means of weight 39. One end of the cable 36 is connected to a terminal block 41 from where connections are also made as required to conventional electrical circuitry to measure the magnetic field strength. One end of cable 37 is also connected to the other end of terminal block 41 and from there connections are made to motor 32 and to a source of electrical power. The other ends of cables 36 and 37 are carried into the tube 11 and connect to elements which will be described later.

Referring now to FIGURE 4 a section of the tube 11 is shown partly cut away to show the construction thereof and to show the movable elements contained therein. A bottom channel member 42 is of a broad and shallow U-shaped cross section and has an inverted V-shaped ridge 43 on one of its upwardly projecting edges and a flat bearing surface 44 on the other such edge. Two flat plates 46 and 47 form the sides of the tube 11 and flat topped members 48 and 49 form the top of the tube 11. The first top member 48 has a flat track 51 which projects downwardly from its lower surface within tube 11. The second top member 49 has a second flat track 52 projecting from its lower side. The tube 11 is enclosed in this manner to provide a stiff supporting beam and to keep dust out of the enclosed mechanism. A rack 53 extends along the track 51 with the teeth of the rack projecting downwardly.

A first movable sled 54 is disposed within tube 11 and has two sliding supports 56 and 57, each grooved near one end, to ride on the V-shaped ridge 43 and has a flat area near the other end to ride on the flat bearing surface 44. A bed plate 58 is yieldably secured below the supports 56 and 57 and between the upturned edges of the bottom channel 42 and has one of the supports secured near each end thereof by means of posts 59. Each of the posts 59 has a coil spring 61 mounted under the flanged top of the post and resting on the top of one of the associated supports 56 and 57. Near the center of bed plate 58 and at right angles thereto a rectangular block 62 is mounted. This rectangular block 62 has two upwardly projecting portions 63 and 64 one adjacent to each end thereof and a shaft 66 is journaled in each of these upwardly projecting portions so that the shaft is at right angles to the longitudinal dimension of bed plate 58. A spur gear 67 secured on shaft 66 between the upwardly projecting portions 63 and 64 meshes with the teeth of the rack 53 causing shaft 66 to turn as sled 54 is moved along and guided by the V-shaped ridge 43. A first wheel 68 and a second wheel 69 are secured on shaft 66 one at eact end thereof. Both whels 68 and 69 have short horizontally projecting pins 71, disposed from the axis of the wheels, on each of which a crank arm 72 is journaled. For purposes to be hereinafter discussed, the axis of the two pins 71 intersects the gear pitch line of spur gear 67.

A bracket 73 mounted on the end of block 62 adjacent to wheel 68 has a microswitch 74 mounted thereon and the roller 76 on the end of the control arm of the microswitch rolls on the rim of the wheel. An indentation 77 in the rim of wheel 68 is located at the proper point on the periphery of the wheel to permit the roller 76 to rise and actuate microswitch 74 when the pins 71 are at the exact top point of their revolution.

A second sled 78 is also disposed within tube 11 for sliding movement therein with mounting means similar to that of first sled 54 including sliding supports 79 and 81 carrying a bed plate 82. Two thin blocks 83 and 84 are transversely mounted on bed plate 82 perpendicular to the top surface thereof with one plate being situated at each end of the bed plate and just inwardly from the supports 79 and 81. Two long rectangular members 86 and 87 are mounted on the blocks 83 and 84 at the top edges thereof, a member being at each side of the assembly and each being parallel to the tube 11. These rectangular members 86 and 87 protrude beyond the blocks 83 and 84 and first shaft 88 is journaled into the projecting ends of these members beyond block 83 and is mounted therebetween with rollers 89 and 91 mounted thereon to roll against the tracks 51 and 52 under the pressure of springs 92, which are part of the mounting for bed plate 82. A second shaft 93 is journaled into the other ends of members 86 and 87 projecting beyond the block 84 and is mounted between these members with rollers 94 and 96 mounted thereon to also roll against the tracks 51 and 52 under the pressure of springs 92. Two short shafts 97 secured one to each of the members 86 and 87 at a central position thereon and projecting outwardly therefrom are journaled one into an end of each of the two crank shafts 72.

The magnet field measuring coil 98 is mounted in the box-like space formed by the members 86 and 87 and the blocks 83 and 84 with the bed plate 82 as a bottom thereof. The coil 98 need not occupy all of this space and may be secured to the bed plate 82. The cable 29 shown in FIGURE 2 passes through a hole in block 62 and is secured thereto at the center of a first yoke 99 at the back of the block. Two cables 101 secured at the two ends of yoke 99 pass on either side of second sled 78 and beyond this sled are secured to the ends of a second yoke 102. The cable 29 is secured at the center of the second yoke 102. By this means the first sled 54 is pulled by the cable 29. The second sled 78 is by-passed by means of the two cables 101 and the two yokes 99 and 102. The second sled 78 therefore is pulled, with a non-uniform motion, by the two crank shafts 72 as moved by the shafts 71 on the wheels 68 and 69. Electrical cables 36 and 37, mentioned previously, coming into tube 11 from the pulley blocks 38 are secured to the supporting member 56 by the insulating clamp 103. From this insulating clamp 103 the cable 36 passes through the block 62 to a terminal block 104 on support 57, to a further terminal block 106 on support 79 with slack between these terminal blocks to allow for the relative motion between sleds 54 and 78. From terminal block 106 cable 36 connects to the measuring coil 98. Cable 37 continues from insulating clamp 103 to microswitch 74 where the two wires of the cable are connected to the two terminals of the microswitch.

Since the tube 11 and sleds 54 and 78 are used in the measurement of a magnetic field which must not be disturbed in making the measurements, all parts of the tube and sleds should be constructed of non-magnetic materials.

In operation the sled 54 is pulled along within tube 11 by means of cable 29 and drive motor 32 and is guided in a straight line by the V-projection 43. During this movement of first sled 54, spur gear 67 meshing with rack 53 turns the shaft 66 and thus the wheels 68 and 69. When the pins 71 projecting from wheels 68 and 69 reach a top point in their circle, at which point their common axis is tangent to the pitch line of the teeth of gear rack 53, the roller 76 on the control arm of microswitch 74 enters the indentation 77 on the wheel 68, stopping the drive motor 32 momentarily. This momentary stop permits taking an accurate reading of the integrated induced voltage in coil 98 at a precisely known location.

Methods for using a moving coil for this purpose, as well known in the art. The motor 32 is then started again for another cycle wherein the wheel 68 makes one more revolution and the sled 54 moves forward another increment of distance along tube 11.

It will be noted that at the point of tangency of the axis of pins 71 to the pitch line of teeth on rack 53 the second sled 78 is stationary and that for several degrees of rotation of the shaft 66 there is a relatively very small motion of the second sled 78. Hence the great advantage of this invention stems from the fact that relatively approximate positioning of the first sled 54 at the point where pins 71 are about at the top position still results in very accurate positioning of the second sled 78. This means that the indentation 77 in the rim of wheel 68, acting on the roller 76 of the control arm of the microswitch 74, provides sufficient accuracy to effect very precise stopping of the coil 98 where otherwise a very complex, delicate and expensive system would be required for the purpose.

Although the invention has been disclosed with respect to a single exemplary embodiment it will be evident to those skilled in the art that many variations are possible within the spirit and scope of the invention. Therefore it is not intended to limit the invention except as defined by the following claims.

What is claimed is:

1. Apparatus for sequentially positioning an element at a series of accurately defined uniformly spaced locations along a linear path comprising, in combination, a track aligned along said path, a first vehicle mounted on said track, means for driving said first vehicle along said track, a second vehicle mounted on said track for movement therealong and having means for carrying said element, and reciprocating linkage coupling said second vehicle to said first vehicle so that said second vehicle is moved along said track at a rate of speed which is minimal near said spaced locations and maximal at points therebetween.

2. Apparatus for sequentially positioning an element at a series of accurately spaced locations along a path comprising, in combination, track means to guide said element along said path, a first vehicle mounted to move on said track means and carrying a rotatable wheel, a motor connected to said first vehicle to drive said first vehicle along said track means and to turn said rotatable wheel, a second vehicle also mounted on said track means and carrying said element, and a linkage connecting said second vehicle to said wheel of first vehicle at a point on said wheel displaced from the rotary axis thereof.

3. Apparatus as described in claim 2 wherein the rim of said wheel engages said track and said wheel is turned by motion of said first vehicle along said track.

4. Apparatus for accurately positioning an element at a series of uniformly spaced locations along a linear path comprising, in combination, track means extending along said path and having a gear rack extending therealong, means travelable along said track for carrying said element therealong, a rotatable gear driven along said rack in engagement therewith, a crank arm having a first end pivotably coupled to said gear approximately at the pitch line thereof whereby said first end of said crank describes a cycloid curve as said gear moves along said rack, the second end of said crank arm being pivotably attached to said element carrying means to move said element along said track with an intermittent motion derived from said cycloid curve.

5. Apparatus for sequentially positioning an element at a series of accurately determined locations along a linear path comprising, in combination, track means extending along said path and having a gear rack extending therealong, means travelable along said track for carrying said element therealong, a rotatable gear travelable along said rack in engagement therewith, a motor coupled to move said gear along said rack, a crank arm having a first end pivotably coupled to said gear at a point substantially at the pitch radius thereof whereby said first end of said crank describes a cycloid curve as said gear moves along said rack, the second end of said crank arm being pivotably attached to said element carrying means to move said element along said track with an intermittent motion determined by said cycloid curve.

6. Apparatus for positioning an element as described in claim 5 and comprising the further combination of a cam operated switch carried along said track with said gear and positioned to be actuated as said first end of said crank arm reaches the node points of said cycloid curve, said switch being connected to control said motor to temporarily stop the travel of said gear along said rack as said first end of said arm reaches said node points.

7. Apparatus for accurately positioning a magnetic field measuring coil at a series of uniformly spaced locations along a linear path within said field comprising, in combination, a linear track of non-magnetic material extending along said path and having a gear rack of non-magnetic material extending therealong, a first vehicle of non-magnetic material movable along said track and carrying thereon a rotatable gear of non-magnetic material in engagement with said rack, a second vehicle of non-magnetic material movable along said track and carrying said magnetic field measuring coil, a motor connected to move said first vehicle along said track thus rotating said gear, and a crank arm having a first end coupled to said gear at a point substantially at the pitch radius of said gear whereby said first end of said crank describes a cycloid curve as said first vehicle moves along said track, the second end of said crank arm being pivotably attached to said second vehicle to move said measuring coil along said track with an intermittent motion determined by said cycloid curve, said second vehicle and said measuring coil stopping instantaneously at the cusps of said curve.

8. Apparatus for accurately positioning a magnetic field measuring coil as described in claim 7 and comprising the further combination of means for moving said track laterally to successive parallel positions to enable the taking of magnet field measurements at distributed points within a plane extending through said magnetic field.

9. Apparatus for accurately positioning a magnetic field measuring coil as described in claim 7 wherein said track and said gear and rack and said first and second vehicles are enclosed within a linear non-magnetic tube extending through said field.

References Cited

UNITED STATES PATENTS

| | | | |
|---|---|---|---|
| 2,504,334 | 4/1950 | Iams | 324—43 X |
| 2,506,433 | 5/1950 | Plesset | 324—43 |
| 2,763,191 | 9/1956 | Wells | 74—88 X |
| 3,159,040 | 12/1964 | Thomas et al. | 74—88 X |

RUDOLPH V. ROLINEC, *Primary Examiner.*

ARCHIE R. BORCHELT, *Examiner.*

S. B. GREEN, R. J. CORCORAN, *Assistant Examiners.*